M. L. CROWE & G. M. DONALDSON.
ROLLER FOR CAR SEATS.
APPLICATION FILED MAY 19, 1914. RENEWED JULY 31, 1916.
1,197,450.  Patented Sept. 5, 1916.
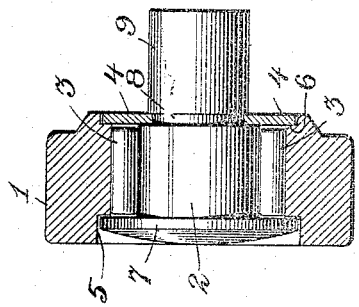
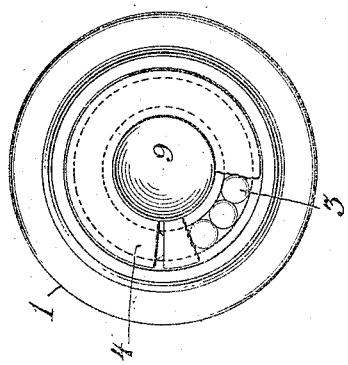
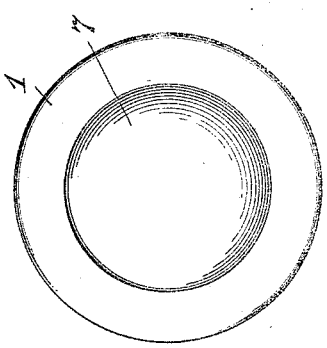
WITNESSES
INVENTORS
BY
ATTORNEY

UNITED STATES PATENT OFFICE.

MYRON L. CROWE, OF HOLLISTON, MASSACHUSETTS, AND GEORGE M. DONALDSON, OF EAST ORANGE, NEW JERSEY.

ROLLER FOR CAR-SEATS.

1,197,450.   Specification of Letters Patent.   Patented Sept. 5, 1916.

Application filed May 19, 1914, Serial No. 839,620. Renewed July 31, 1916. Serial No. 112,476.

*To all whom it may concern:*

Be it known that we, MYRON L. CROWE and GEORGE M. DONALDSON, the one being a resident of the town of Holliston, in the county of Middlesex and Commonwealth of Massachusetts, and the other being a resident of East Orange, in the county of Essex, in the State of New Jersey, have invented a certain new and useful Improvement in Rollers for Car-Seats, of which the following is a specification.

This invention relates to rollers for sliding car seats, casters and the like, and its object is to provide a device of this character in which the load is carried by a pin mounted in anti-friction bearings. This and other objects are attained in the device set forth in the following description and accompanying drawings in which like reference characters refer to corresponding parts.

In the drawings: Figure 1 is an outside end view of the roller; Fig. 2, an inside end view showing a part broken away, and Fig. 3, a longitudinal sectional view of Figs. 1 and 2.

The bearing consists essentially of three sets of parts, viz: the outside ring, or roller proper, 1, the journal pin 2, the anti-friction rollers 3 and the split ring or collar 4. The outside ring 1 is cylindrical in form but apertured centrally and provided with an annular recess 5 in its outer end and an annular recess 6 in its inner end. The bearing pin 2 is provided with a flanged head 7 the under side of which flange is seated against the shoulder formed by the annular recess 5. The bearing pin 2 is also provided with a circular groove 8 and a projecting portion 9. The body portion of the bearing pin 2 is of less diameter than the aperture in the roller proper 1 so that an annular channel is formed between the body portion of the bearing pin and the wall of the circular aperture in the roller 1. Disposed within this annular channel and substantially coincident in length therewith is a set of cylindrical rollers 3. The annular channel in which these rollers are disposed is closed at its outer end by the flanged head 7 of the bearing pin while its inner end is closed by the split ring 4 which, when the parts are all assembled, is seated in the annular groove 8 of the bearing pin. The thickness of the head 7 of the bearing pin is such that when seated in the annular recess 5 it is substantially flush with the end of the roller proper 1 allowing for the curvature of the head so that no part projects beyond the outside end of the roller. The diameter of the annular split ring 4 is such that when seated in the recess 6 it entirely closes the inside end of the channel in which the anti-friction rollers 3 are disposed. The split ring 4 is also seated in the annular groove 8 and thereby prevents any longitudinal movement of the split ring on the bearing pin. Since the ring 1 is revoluble relatively to the bearing pin 2 the split ring 4 necessarily loosely engages either one or the other of said parts. This loose engagement, however, does not destroy the action of the split ring as a closure for the end of the channel. To disassemble the roller to replace the anti-friction rollers or for any other purpose it is merely necessary to spread the annular retaining plate so that its inner edge will clear the groove in the bearing pin and slip the retaining plate off the pin. Thus it may be seen that both ends of the roller proper 1 are closed and are substantially flush so that no projecting portions can catch upon passing garments. In the case of utilizing the rollers for carrying a sliding car seat the projection 9 of each roller is inserted in the extremities respectively of the car seat so that the load is transferred from the seat to the bearing pin which is journaled within its anti-friction rollers 3 in the outer ring or roller proper 1, the latter revolving on the anti-friction bearings around the bearing pin. Heretofore, especially in the case of rollers for car seats it has usually been the custom to ship the roller assembled and to remove a washer which was driven onto the inner end of the bearing pin for the purpose of holding the parts assembled temporarily which washer could be removed and the inner end of the annular channel closed by its contact with some flat element on the end of the car seat. The removing of this temporary washer which was used merely during the transportation of the rollers necessitated much time and trouble and to overcome this objection the bearing pin was grooved and the roller 1 recessed in order to utilize the split ring which would not only hold the parts assembled during transportation but could be left in place when mounted on the car seat. Of course, it is obvious that this roller may have other uses than that described herein, such as abandoning the head 7 and replacing the same by the split ring as hereinbefore described.

Having now described this invention what we desire to claim and protect by Letters Patent is:

1. A load-carrying roller consisting of an outer ring having its ends recessed to form abutting shoulders, a concentric bearing pin having at one end a flanged head seated against one of said shoulders and having near its other end a circumferential groove, the said bearing pin being of less diameter than the bore of the ring forming an annular channel between the bearing pin and the inner wall of the ring, a series of anti-friction rollers disposed around said bearing pin in said channel, and a radially slit annular retaining plate having its inner edge sprung into said groove in the bearing pin and having its outer edge seated against the other shoulder of said ring, the said retaining plate loosely engaging one of the latter two parts whereby the said ring may revolve relatively to said bearing pin and the said retaining plate close the inner end of said channel.

2. A load-carrying roller consisting of an outer ring having its ends recessed to form abutting shoulders, a concentric bearing pin having at one end a flanged head seated against one of said shoulders and having near its other end a circumferential groove, the said bearing pin being of less diameter than the bore of the ring forming an annular channel between the bearing pin and the inner wall of the ring, a series of anti-friction rollers disposed around said bearing pin in said channel, and a removable radially slit annular retaining plate having its inner edge sprung into said groove in the bearing pin and having its outer edge seated against the other shoulder of said ring, the said retaining plate and flanged head being wholly within said ring, the said retaining plate loosely engaging one of the latter two parts whereby the said ring may revolve relatively to said bearing pin and the said retaining plate close the inner end of said channel.

3. A load-carrying roller consisting of an outer ring, a concentric bearing pin having a circumferential groove near one of its extremities, the said bearing pin being of less diameter than the bore of the ring, a series of anti-friction rollers disposed around said bearing pin in the space between said bearing pin and ring, and means for closing said space at each end of the ring, the said means at one end comprising a radially slit annular retaining plate having its inner edge sprung into the groove in the bearing pin and its outer edge seated against the adjacent end of said ring, the said retaining plate entirely closing the end of the ring.

4. An antifriction bearing consisting of an outer ring, a concentric bearing pin having a flanged head at one end seated against the outer end of the ring and having a circumferential groove near its other end, the said bearing pin being of less diameter than the bore of the ring forming an annular channel between the bearing pin and the inner wall of the ring, a series of antifriction rollers disposed around said bearing pin in said channel, and a radially slit annular retaining plate having its inner edge sprung into the said groove in the bearing pin and having its outer edge seated against the inner end of said ring, the said retaining plate loosely engaging one of the latter two parts whereby the said ring may revolve relatively to said bearing pin and the said retaining plate close the inner end of said channel.

In testimony whereof we have hereunto set our hands this 11th day of May 1914.

MYRON L. CROWE.
GEORGE M. DONALDSON.

Witnesses:
ALBERT B. POND,
HENRY A. CULVERHOUSE.

Copies of this patent may be obtained for five cents each, by addressing the "Commissioner of Patents, Washington, D. C."